(12) United States Patent
Rouyer et al.

(10) Patent No.: US 8,631,640 B2
(45) Date of Patent: Jan. 21, 2014

(54) JET ENGINE NACELLE EQUIPPED WITH A SYSTEM FOR MECHANICALLY INHIBITING A THRUST REVERSER

(75) Inventors: Pascal Gerard Rouyer, Saint Romain de Colbosc (FR); Emmanuel Lesteven, Triqueville (FR)

(73) Assignee: Aircelle, Gonfreville l'Orcher (FR)

( * ) Notice: Subject to any disclaimer, the term of this patent is extended or adjusted under 35 U.S.C. 154(b) by 970 days.

(21) Appl. No.: 12/672,101

(22) PCT Filed: Jun. 16, 2008

(86) PCT No.: PCT/FR2008/000834
§ 371 (c)(1),
(2), (4) Date: Feb. 4, 2010

(87) PCT Pub. No.: WO2009/027591
PCT Pub. Date: Mar. 5, 2009

(65) Prior Publication Data
US 2011/0259435 A1    Oct. 27, 2011

(30) Foreign Application Priority Data
Aug. 20, 2007 (FR) ...................................... 07 05889

(51) Int. Cl.
*F02K 1/70* (2006.01)
(52) U.S. Cl.
USPC .................. 60/226.2; 239/265.27; 244/110 B
(58) Field of Classification Search
USPC ............................ 60/226.2, 230; 239/265.19, 239/265.23–265.31; 244/110 B
See application file for complete search history.

(56) References Cited

U.S. PATENT DOCUMENTS

| 4,391,409 A | 7/1983 | Scholz |
| 4,679,750 A * | 7/1987 | Burhans ..................... 244/129.4 |

(Continued)

FOREIGN PATENT DOCUMENTS

| EP | 1286037 A1 | 2/2003 |
| EP | 1288479 A2 | 3/2003 |

(Continued)

OTHER PUBLICATIONS

International Search Report PCT/FR2008/000834; Dated Feb. 4, 2009.

*Primary Examiner* — Ted Kim
(74) *Attorney, Agent, or Firm* — Brinks Gilson & Lione

(57) ABSTRACT

The present invention relates to a jet engine nacelle comprising a forward air inlet section, a mid-section intended to surround a jet engine fan, and an aft section equipped with at least one thrust reversal system comprising, on the one hand, means for deflecting at least part of an air flow of the jet engine and, on the other hand, at least one cowl (12) mounted translatably along at least one guide rail (15) in a direction substantially parallel to a longitudinal axis of the nacelle, said movable cowl being able to switch alternately from a closed position, in which it provides the nacelle with aerodynamic continuity and covers the deflection means, to an open position in which it opens a passage in the nacelle and uncovers said deflection means, the nacelle being characterized in that the aft section is equipped with at least one stud (18) mounted such that it can move over a fixed structure of the aft section in the region of the guide rail between a retracted position, in which said stud is withdrawn from the running track of the rail and allows a translational movement of the movable cowl, and an engaged position, in which it forms a stop capable of preventing the movable cowl from sliding in the downstream direction of the nacelle.

10 Claims, 3 Drawing Sheets

(56) References Cited

U.S. PATENT DOCUMENTS

| | | | | |
|---|---|---|---|---|
| 5,904,041 A * | 5/1999 | Dhainault | ............... | 60/226.2 |
| 6,293,489 B1 * | 9/2001 | Davies | ............... | 60/230 |
| 6,554,224 B2 * | 4/2003 | Sternberger | ............... | 60/226.2 |
| 7,216,581 B2 * | 5/2007 | McAuley | ............... | 244/102 SL |
| 8,070,101 B2 * | 12/2011 | Vauchel et al. | ............... | 244/110 B |
| 2003/0024236 A1 * | 2/2003 | Lymons et al. | ............... | 60/226.2 |
| 2004/0231317 A1 * | 11/2004 | Dehu et al. | ............... | 60/226.2 |
| 2006/0059886 A1 * | 3/2006 | Strunk et al. | ............... | 60/226.2 |
| 2008/0134664 A1 * | 6/2008 | Brannon et al. | ............... | 60/226.2 |

FOREIGN PATENT DOCUMENTS

| | | |
|---|---|---|
| EP | 1298309 A1 | 4/2003 |
| WO | 03100241 A1 | 12/2003 |

\* cited by examiner

JET ENGINE NACELLE EQUIPPED WITH A SYSTEM FOR MECHANICALLY INHIBITING A THRUST REVERSER

TECHNICAL FIELD

The disclosure relates to a nacelle for a jet engine.

BACKGROUND

An aircraft is driven by a plurality of jet engines, each of which is accommodated in a nacelle.

A nacelle generally has a tubular structure, comprising an air inlet which is upstream from the jet engine, a mid-section which is designed to surround a fan of the jet engine, and a downstream section which optionally incorporates thrust reversal means, is designed to surround the combustion chamber of the jet engine, and generally ends in an exhaust nozzle, the outlet of which is situated downstream from the jet engine.

Modern nacelles are designed to accommodate a dual flow jet engine, which can firstly generate a hot air flow (also known as the primary flow) which is obtained from the combustion chamber of the jet engine, and secondly a cold air flow (secondary flow) which is obtained from the fan, and circulates on the exterior of the jet engine by means of an annular passage, also known as the gap, formed between an inner structure which defines a fairing of the jet engine, and an inner wall of the nacelle. The two air flows are discharged from the jet engine from the rear of the nacelle.

The role of a thrust reverser is, when an aircraft is landing, to improve the braking capacity of the latter, by redirecting forwards at least part of the thrust which is generated by the jet engine. In this phase, the reverser obstructs the stream of the cold flow, and directs it towards the front of the nacelle, thus generating a counter-thrust which is added to the braking of the wheels of the aircraft.

The means which are implemented in order to obtain this reorientation of the cold flow vary according to the type of reverser. However, in all cases, the structure of a reverser comprises movable cowls which can be displaced between firstly a deployed position, in which they open up in the nacelle a passage which is destined for the deflected flow, and secondly a retracted position, in which they close this passage. These cowls can fulfil a function of deflection, or simply of activation of other deflection means.

In the case of a reverser with grids, which is also known as a cascade reverser, the reorientation of the flow of air is carried out by deflection grids, and the cowl has only a simple sliding function which uncovers or re-covers these grids. Complementary locking doors, which are also known as shutters, and which are activated by the sliding of the cowl, generally permit closing of the gap downstream from the grids, such as to optimise the reorientation of the cold flow.

During maintenance operations on a jet engine and the nacelle which surrounds it, it is important to ensure that the movable cowls cannot open unexpectedly, which would constitute a danger for the operators.

Similarly, when the internal safety mechanisms of the reverser are damaged, which mechanisms are known as the PLS (Primary Lock System) and TLS (Tertiary Lock System), it may be preferable to inhibit the movable cowls mechanically rather than risk deployment in flight, which would be catastrophic.

The inhibition of the movable reverser cowls during maintenance operations can be obtained by means of electrical and/or mechanical inhibition systems. Inhibition of the reverser in flight is preferably carried out mechanically.

Mechanical inhibition of this type is generally carried out by screwing movable cowls onto a fixed structure of the nacelle, and/or by putting locking studs into place downstream from the movable cowls according to a substantially radial direction, the said studs then acting as stop means which prevent any longitudinal translation movement of the movable cowl.

A system of this type has numerous disadvantages.

Firstly, the studs or screws must be stored on the aircraft, generally inside a receptacle which is provided in the nacelle.

Then, putting the studs into place or screwing on of the cowls is a lengthy and tedious operation which requires suitable tooling.

It should also be noted that the new generation of large carriers is equipped with particularly powerful jet engines, which are surrounded by a nacelle with large dimensions. Their movable cowls are therefore all the heavier, and their mechanical inhibition requires putting into place of particularly strong retention means. This results in the need for additional locking studs or screws, which is not desirable.

It will also be noted that the movable cowls of thrust reversers are generally in the form of two semi-cylindrical cowls which slide on a minimal fixed structure comprising one or a plurality of upper beams which are situated at approximately twelve o'clock in the region of the strut, and one or a plurality of lower beams which are situated at approximately six o'clock, with the said sliding beams supporting rails to guide the movable cowls. For reasons of synchronisation of the movable cowls, and of safety, the two semi-cylindrical movable cowls can be connected mechanically. It is therefore necessary to provide studs or screws which, in the event of deficiency of the other studs or screws, can withstand all of the force which is generated by all of the jacks dedicated to the deployment of the movable cowls.

Thus, whereas an obvious solution could consist of reducing the number of studs or screws to the point where optionally only one of them would then be needed, the size of this stud would have to be such as to be able to bear the weight of two movable cowls. In fact, another problem is derived from the fact that the screws or studs which are used conventionally generally have a cylindrical or conical shape, and consequently have to withstand substantial shearing forces when they are subjected to stress by the movable cowl. A second problem therefore consists of improving the distribution of the forces which are exerted on the stud, in order to be able to optimise the dimensions of the latter.

BRIEF SUMMARY

The disclosure provides a jet engine nacelle comprising a forward air inlet section, a mid-section intended to surround a jet engine fan, and an aft section equipped with at least one thrust reversal system, comprising, on the one hand, means for deflecting at least part of an air flow of the jet engine, and, on the other hand, at least one cowl mounted translatably along at least one guide rail, in a direction substantially parallel to a longitudinal axis of the nacelle, the said movable cowl being able to switch alternately from a closed position in which it provides the nacelle with aerodynamic continuity, and covers the deflection means, to an open position in which it opens a passage in the nacelle and uncovers the said deflection means, the nacelle being characterized in that the aft section is equipped with at least one mechanical inhibition stud mounted such that it can move over a fixed structure of the aft section in the region of the guide rail, between a retracted position in which the said stud is withdrawn from the running track of the rail, and allows translation of the movable cowl, and an engaged position, in which it forms a stop capable of preventing the movable cowl from sliding in the downstream direction of the nacelle.

Thus, by installing an integrated inhibition system, it is no longer necessary to carry out fitting and dismantling of mechanical inhibition means, or to store these on the nacelle. In addition, since the stud is localised in the region of a fixed structure, it uses the main paths of transmission of force, and part of the load which is supported by the stud can more easily be distributed on the fixed structure which supports the reverser.

Advantageously, the stud is fitted such as to be movable on a sliding plane of the rail, and perpendicularly to the latter. In fact, it has been found that insertion of the stud in this direction permits better distribution of the forces in the stud.

According to a first variant embodiment, the movable stud is equipped with manual activation means.

According to a second variant embodiment, the movable stud is equipped with electrical activation means.

Advantageously, the movable stud is associated with means for indication of its state of engagement and/or retraction.

Preferably, the stud has a surface of contact which is substantially flat in relation to the rail. Thus, providing a flat contact surface assists recovery from compression forces, and thus limits the shearing forces.

Advantageously, the contact surface of the stud matches the profile of the rail.

Advantageously, at least one stud is fitted on a lower longitudinal beam of the rear structure.

Preferably, the nacelle according to the invention comprises two semi-cylindrical movable cowls.

More preferably, the cowls can be mechanically connected to one another. This connection can be permanent or unlockable. By this means, the two movable cowls then form a single mechanical unit, which, provided that the latter has suitable dimensions, makes it possible to reduce the number of inhibition studs to a single stud for all of the movable cowls.

According to a preferred embodiment of the invention, the movable stud is fitted on a fixed structure of the aft section by means of a drive system comprising at least one connecting rod which is fitted such as to pivot on the said fixed structure.

BRIEF DESCRIPTION OF THE DRAWINGS

Other characteristics and advantages of the present invention will become apparent in the light of the following description, and by examining the attached figures, in which:

FIG. 1 represents a nacelle 1 for a dual flow jet engine.

DETAILED DESCRIPTION

Figure 1:
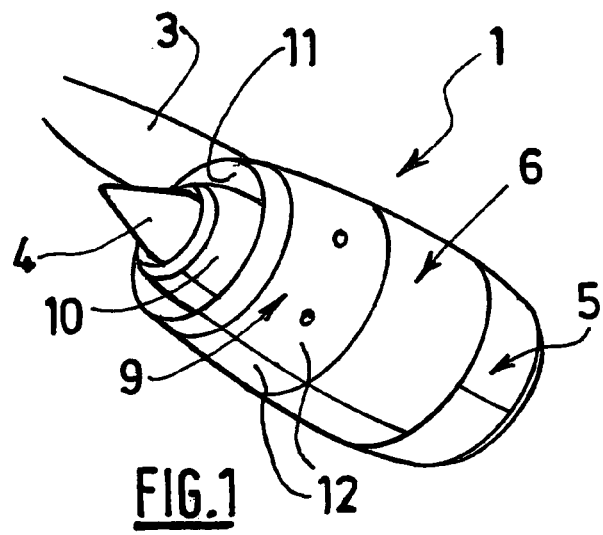
FIG. 1 is a schematic representation of a jet engine nacelle seen from beneath.
Figure 2:
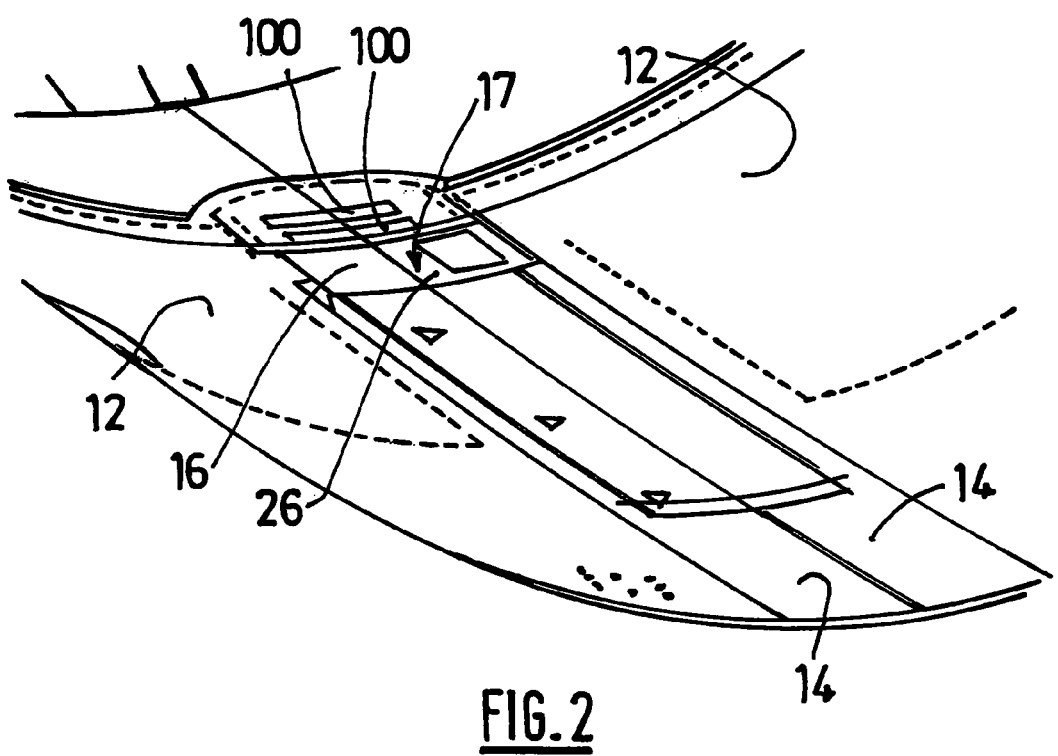
FIG. 2 is an enlarged view of a lower aft part of the nacelle in FIG. 1.
Figure 3:
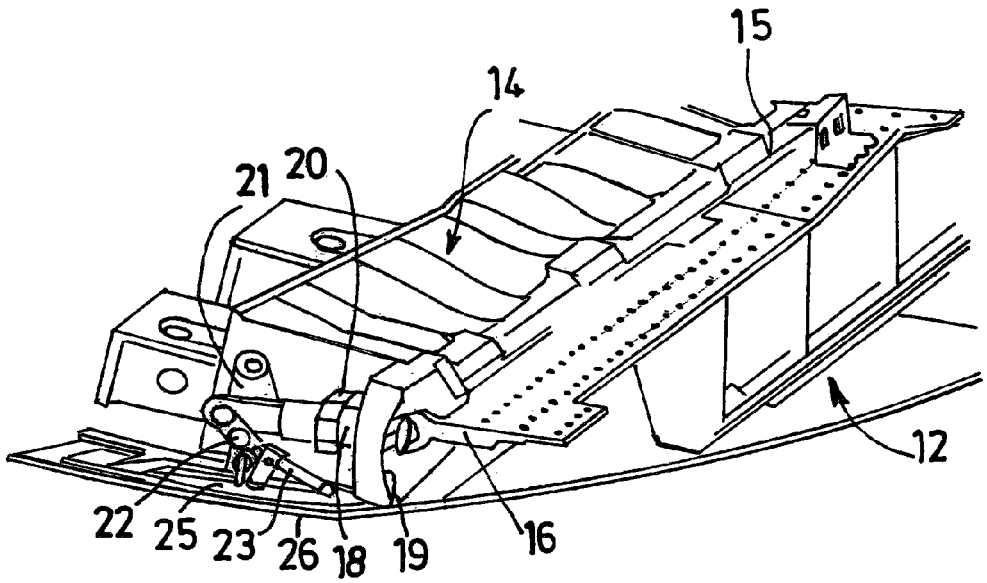
FIG. 3 is a partial schematic representation of a movable thrust reverser cowl, fitted such as to slide along a rail which is integral with a beam equipped with a detachable mechanical inhibition stud.
Figure 4:
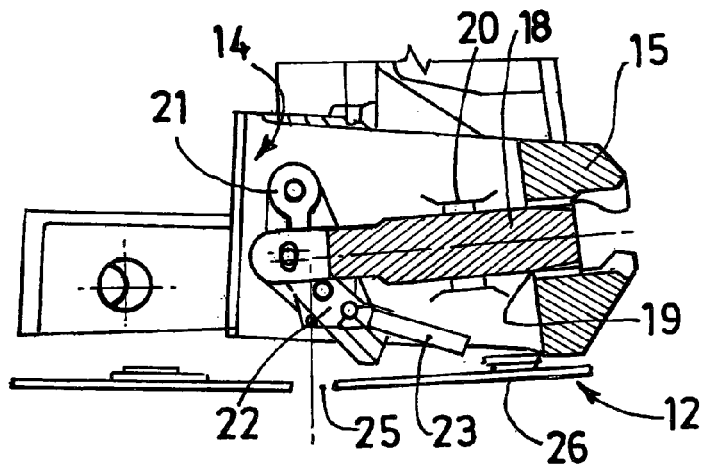
FIG. 4 is a front view in cross-section of the stud in FIG. 3, in the retracted position.
Figure 5:
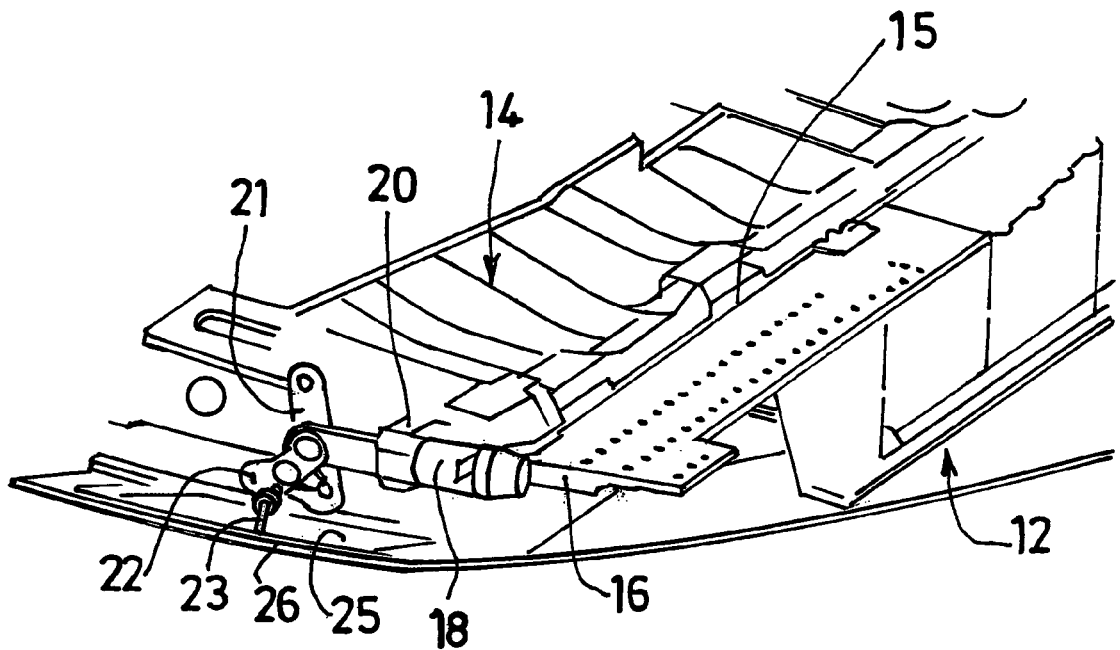
FIG. 5 differs from FIG. 3 in that the movable stud is in the engagement position, thus permitting inhibition of the movable cowl.
Figure 6:
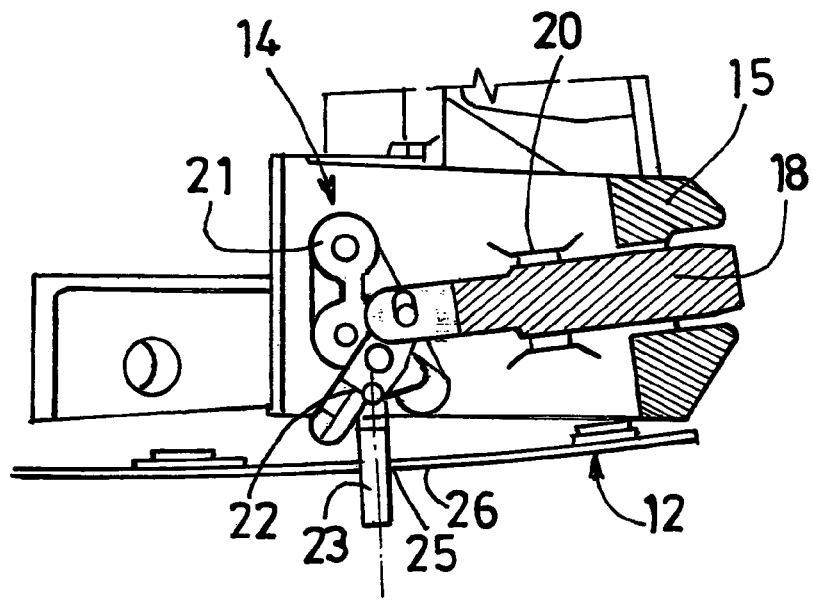
FIG. 6 is the equivalent of FIG. 4, showing the stud in the engagement position.

The nacelle 1 constitutes a tubular receptacle for a jet engine 4, it is used to channel the flows of air generated by the latter, and is designed to be attached beneath a wing (not shown) of an aircraft by means of an oblique strut 3 which is oriented towards the front of the aircraft. It also accommodates different components which are necessary for the functioning of the jet engine 4.

More particularly, the nacelle 1 has an outer structure comprising a front section 5 which forms an air inlet, a mid-section 6 which surrounds a fan (not shown) of the jet engine, and an aft section 9 which surrounds the engine, and comprises a thrust reversal system.

The aft section 9 extends the mid-section 6, and comprises an outer structure which provides the aerodynamic continuity with the mid-section 6, and accommodates the thrust reversal means. It also comprises an inner structure 10 for the engine fairing 4, which defines together with the outer structure a gap 11 which is designed for the circulation of a flow of cold air, in the case of a dual flow jet engine, such as the one represented in this case.

The thrust reversal system comprises cowls 12 which are movable in translation, and can switch alternately, firstly from a closed position in which it covers the deflection grids (not shown) and provides the structural continuity of the mid-section 6, thus permitting discharge of the cold flow through the gap 11 in a so-called direct jet, and secondly to an open position in which it uncovers the deflection grids, thus opening a passage in the nacelle 1, and, by itself or by activation of distinct blocking means, blocks the gap 11 downstream from the deflection grids, thus permitting reorientation of the cold flow according to a so-called reverse jet.

The movable cowls 12 are mounted translatably along guide rails 15 which are integral with a fixed structure of the rear section 9.

More specifically, the rear section 9 is produced in the form of two lateral half-parts which are situated on both sides of the nacelle 1, which can be opened to permit access to the jet engine 4.

Each half-part comprises an upper edge which is equipped with means (not shown) for attachment to the strut 3, and are of the lock type (for lateral opening) or of the hinge type (for radial opening), and a lower edge which is equipped with locking means which can provide the closing of the two half-parts.

Each half-part thus comprises a fixed structure which is produced from an upper longitudinal beam (not shown) situated in the vicinity of the strut 3, and a lower longitudinal beam 14, each of these beams comprising at least one guide rail 15, inside which there is inserted a corresponding slide 16 which belongs to the associated movable cowl 12.

In addition, the movable cowl 12 of each part is mechanically connected to the movable cowl 12 of the other part by connection means 100 which can be unlocked, on a part of the length of the movable cowls 12 which is situated downstream from the guide rails 15 of the lower longitudinal beams 14.

As previously explained, the thrust reverser is equipped with a plurality of locking systems, i.e. primary locks (not shown), a tertiary lock and a mechanical inhibition system 17, which is the subject of the present invention.

The mechanical inhibition system 17 is in the form of a blocking stud 18 which is fitted in a movable manner in the region of a downstream end of a lower longitudinal beam 14, according to a direction which is transverse to the latter, and through a corresponding opening 19 which is provided in a lateral surface, in the region of an end of the corresponding rail 15, the said stud 18 also being mounted movably on the longitudinal beam 14, between a retracted position in which the stud 18 does not project from the lateral surface, and an engagement position in which the stud 18 projects from the lateral surface through the opening 19, such as to constitute an end stop for the rail 15.

A guide ring 20 which is integral with the beam 14 makes it possible to assure good translation of the stud 18.

The activation of the stud 18 is in this case provided manually by means of a system of rocker bars 21, which make it possible to transform a tilting movement of a handle into movement of translation of the stud 18.

This system of rocker bars 21 is associated with a secondary system of rocker bars 22, which can give rise simultaneously to the movement of a state marker 23, between a retracted position corresponding to the position of retraction of the stud 18, and in which the said state marker 23 is retracted from a wall of the movable cowl 12, and an engagement position, corresponding to the position of engagement of the stud 18, and in which the said state marker 23 projects from the movable cowl 12 through a corresponding slot 25.

Advantageously, a part of the wall of the movable cowl 12 comprising the slot 25 will be produced in the form of a trap door 26, which makes it possible to access the manual control means of the inhibition stud 18.

It will be appreciated that, alternatively or additionally, it will be possible to provide means for electrical activation of the stud 18, as well as state indication light means.

As previously stated, since the movable cowls 12 are connected mechanically, it is possible, as in the example described here, to have only a single inhibition stud 18 which can provide the blocking of all of the cowls.

Clearly, in the case when the movable cowls 12 are not connected mechanically, it will be necessary to provide one inhibition system 17 per movable cowl 12.

In addition, it should be noted that, according to a preferred aspect of the invention, the stud 18 has a surface of contact with the slide 16 which is substantially flat, such as to assist recovery of the forces in the form of compression rather than shearing.

It will be appreciated that the present invention is in no way limited to the embodiments described and represented, which are provided by way of simple illustrative examples.

The invention claimed is:

1. A nacelle for a jet engine, comprising a forward air inlet section, a mid-section intended to surround a jet engine fan, and an aft section equipped with at least one thrust reversal system, comprising:

means for deflecting at least part of an air flow of the jet engine, and, at least one cowl mounted translatably along at least one guide rail, in a direction substantially parallel to a longitudinal axis of the nacelle, the movable cowl being able to switch alternately from a closed position in which the cowl provides the nacelle with aerodynamic continuity, and covers the deflection means, to an open position in which the cowl opens a passage in the nacelle and uncovers the deflection means, wherein the aft section is equipped with at least one mechanical inhibition stud being movably mounted on a fixed structure of the aft section in a region of the guide rail such that the stud can move between a retracted position in which the stud is withdrawn from a running track of the guide rail, and allows translation of the movable cowl, and an engaged position, in which the stud forms a stop capable of preventing the movable cowl from sliding in a downstream direction of the nacelle, wherein the movable mechanical inhibition stud is equipped with manual activation means comprising a system of rocker bars.

2. A nacelle as claimed in claim 1, wherein the mechanical inhibition stud is fitted such as to be movable on a sliding plane of the rail, and perpendicularly to the latter.

3. A nacelle as claimed in claim 1, wherein the movable mechanical inhibition stud is equipped with electrical activation device.

4. A nacelle as claimed in claim 1, wherein the movable mechanical inhibition stud is associated with means for indication of a state of engagement and/or retraction.

5. A nacelle as claimed in claim 1, wherein the mechanical inhibition stud has a surface of contact which is substantially flat in relation to the rail.

6. A nacelle as claimed in claim 5, wherein the contact surface of the mechanical inhibition stud matches a profile of the rail.

7. A nacelle as claimed in claim 1, wherein at least one mechanical inhibition stud is fitted on a lower longitudinal beam of the aft section.

8. A nacelle as claimed in claim 1, further comprising two semi-cylindrical movable cowls.

9. A nacelle as claimed in claim 8, wherein the cowls can be mechanically connected to one another.

10. A nacelle as claimed in claim 1, wherein the movable mechanical inhibition stud is fitted on a fixed structure of the aft section by means of a drive system comprising at least one connecting rod which is fitted such as to pivot on the said fixed structure.

* * * * *